United States Patent [19]

Kondo et al.

[11] 4,387,140

[45] Jun. 7, 1983

[54] SLIDE MEMBER

[75] Inventors: Katsumi Kondo; Yoshio Fuwa; Shoji Miyazaki, all of Toyota, Japan

[73] Assignee: Toyota Jidosha Kogyo Kabushiki Kaisha, Toyota, Japan

[21] Appl. No.: 220,053

[22] PCT Filed: Jun. 28, 1980

[86] PCT No.: PCT/JP80/00148

§ 371 Date: Dec. 15, 1980

§ 102(e) Date: Dec. 15, 1980

[87] PCT Pub. No.: WO81/00117

PCT Pub. Date: Jan. 22, 1981

[30] Foreign Application Priority Data

Jun. 28, 1979 [JP] Japan .............................. 54-081816

[51] Int. Cl.³ .............................................. B22F 5/04
[52] U.S. Cl. .................................... 428/553; 428/457; 428/678; 428/937; 427/34; 427/423; 75/255
[58] Field of Search ............... 428/911, 457, 539, 682, 428/937, 547, 685, 678; 75/255; 427/34, 423

[56] References Cited

U.S. PATENT DOCUMENTS 3,184,331  5/1965  Carter ................................ 428/937
3,606,359  9/1971  McCormick .
3,725,017  4/1973  Prasse et al. ...................... 428/937
3,740,212  6/1973  Church .
4,275,090  6/1981  McComas et al. .................. 427/34

FOREIGN PATENT DOCUMENTS 2849745  5/1979  Fed. Rep. of Germany ...... 428/937
2816520  10/1979  Fed. Rep. of Germany ........ 427/34
54-25232  2/1979  Japan .................................... 427/34

Primary Examiner—George F. Lesmes
Assistant Examiner—E. Rollins Buffalow
Attorney, Agent, or Firm—Oblon, Fisher, Spivak, McClelland & Maier

[57] ABSTRACT

The present invention relates to a slide member which has excellent wear, seizing, and scuffing resistances, and excellent adherence property, and which can be used even under high-temperature conditions, and which is suited for being applied to slide surfaces of piston rings, cylinder liners and slide surfaces of the air compressors for internal combustion engines. For this purpose, according to the present invention, the slide surface has a layer which is formed by plasma spray-coating of a powdery mixture consisting of 5 to 80% by weight of an Fe/Ni alloy and 95 to 20% by weight of an Fe/high-Cr alloy.

6 Claims, 1 Drawing Figure

SLIDE MEMBER

TECHNICAL FIELD

The present invention relates to a slide member which is most suitable for a slide surface of, for example piston rings, cylinder liners and air compressors for internal combustion engines.

BACKGROUND ART

Recently, increasing demands have been placed for anti-wear and anti-seizing material and low-friction material considering that light alloy need to be used and miniaturization is necessary as countermeasures for higher rotation speed, higher compression ratio, weight reduction and fuel consumption improvement for the purpose of enhancing the performance in the internal combustion engine, and extensive studies have heretofore been conducted.

So far, it has been publicly known to form a wear-resistant layer by spray-coating or plating a metal, an oxide or a carbonate onto the sliding portions of the machine parts.

The wear-resistant layer is discussed below exemplifying a piston ring. Most of the conventional surface-treated piston rings are ones obtained by plating chromium or spray-coating of molybdenum onto the outer peripheral surfaces of the steel-base piston ring member.

However, the chromium-plated piston ring exhibits poor seizing resistance relative to the cylinder liner composed of cast iron as an opponent member, and hence seizing and scuffing are liable to take place. In order to improve the above-mentioned drawback, the cylinder liners made of cast iron to which nickel, chromium, molybdenum and/or boron, and niobium are added are used. The above cast iron, however, exhibits poor workability as compared with ordinary cast irons (FC material), and hence presents another disadvantage such as increased manufacturing cost.

The piston ring onto which molybdenum is spray-coated, on the other hand, exhibits good seizing resistance with respect to the cylinder liner composed of cast iron as an opponent member. With the engines which are subjected to the thermal load of higher than 300° C., however, the oxidation of molybdenum imposes problem with regard to adherence property between the piston ring member and the spray-coated layer. Moreover, molybdenum is so expensive that the piston ring eventually becomes expensive.

The present invention is to eliminate the above-mentioned defects inherent in the conventional arts, and its object is to provide a slide member which can be used for forming slide surfaces of piston rings, cylinder liners, slide surfaces of pistons, and slide surfaces of air compressors, and which is less expensive than the molybdenum spray-coated materials, and which exhibits excellent wear resistance and adherence property, and which exhibits superior scuffing resistance to the chromium-plated materials, and which can be used even under high-temperature conditions.

DISCLOSURE OF INVENTION

The present invention provides a slide member the surface onto which a spray-coating is provided by plasma spray-coating, a powdery mixture of 5 to 80% by weight (percents hereinafter are all percent by weight) of an Fe/Ni alloy based on the total amount of the powders and 95 to 20% of an Fe/high-Cr alloy powder, or preferably a powdery mixture of 10 to 70% of the Fe/Ni alloy powder and 90 to 30% of the Fe/high-Cr alloy powder.

According to the present invention which employs the Fe/Ni alloy powder mixed with the Fe/high-Cr alloy powder in combination, the resulting spray-coated layer possesses advantages of each of the alloy powders while compensating the defects thereof. Namely, the spray-coated layer of Fe/high-Cr alloy exhibits a Vickers' hardness of 830 to 1000 which is comparable to that of chrome plating, and exhibits good wear resistance itself, but causes the opponent member to be greatly worn out.

The spray-coated layer of Fe/Ni alloy, on the other hand, exhibits a Vickers' hardness of 500 to 750 and it exhibits excellent wear resistance and scuffing resistance by the formation of chromium borate, chromium carbonate and nickel silicide, and it has a low coefficient of friction. This layer, however, has a large coefficient of thermal expansion which deteriorates the adherence property.

On the other hand, the layer which is obtained by plasma spray-coating of the above-mentioned two powders at ratios as defined by the present invention, exhibits a Vickers' hardness over a range of 450 to 1000, seizing-resistance and its own wearing rate which are comparable with those of the spray-coated layer of Fe/high-Cr alloy, causes the opponent member to be worn out very little as compared with the spray-coated layer of Fe/high-Cr alloy, and further exhibits good adherence property. Moreover, the slide member of the present invention does not lose the hardness even at a temperature of as high as 300° to 350° C.

In other words, the slide member according to the present invention is excellent in that it exhibits superior wear resistance to that of the members having conventionally spray-coated layer of molybdenum or chrome plating, exhibits scuffing resistance which is superior to that of the chrome-plated members, presents excellent seizing resistance, causes the opposing member to be worn out least. And since it can further be manufactured at reduced costs, it is most suitable for use under severe conditions where wear and seizing resistances is required.

BRIEF DESCRIPTION OF DRAWINGS

The FIGURE is a graph which illustrates the results of wear test of a working example 2 according to the present invention, in which the amounts worn out of members and of the opponent members are shown based on the results of wear tests as to the end surfaces of the dice which are:

(A) plated with chromium;
(B) gas spray-coated with molybdenum;
(C) plasma spray-coated with a powdery mixture consisting of 10% of the Fe/Ni alloy and 90% of the Fe/high-Cr alloy;
(D) plasma spray-coated with a powder mixture consisting of 30% of the Fe/Ni alloy and 70% of the Fe/high-Cr alloy;
(E) plasma spray-coated with a powdery mixture consisting of 70% of the Fe/Ni alloy and 30% of the Fe/high-Cr alloy; and
(F) plasma spray coated with 100% of the Fe/high-Cr alloy powder.

BEST MODE OF CARRYING OUT THE INVENTION

Figure 1:
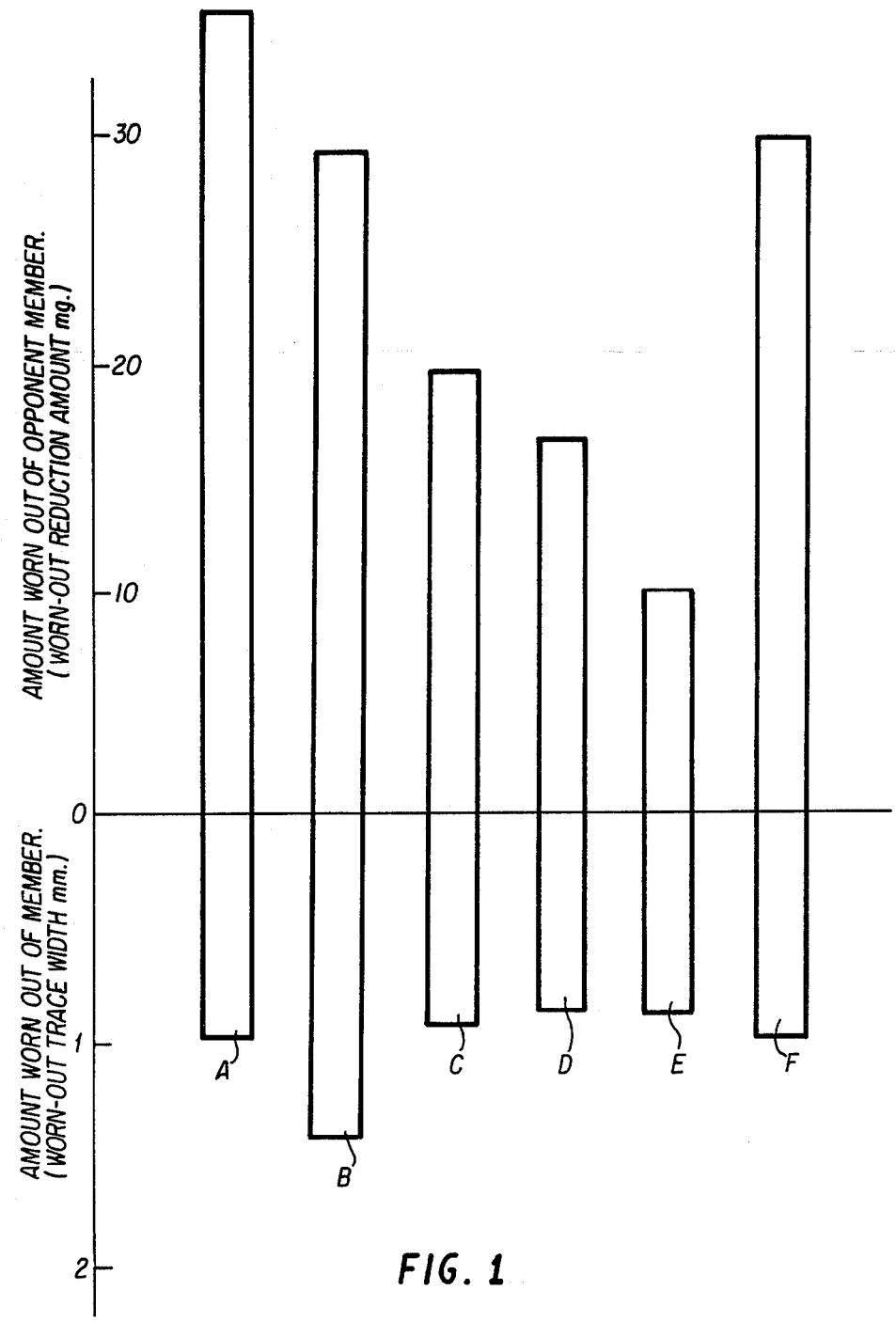

The slide member according to the present invention will be concretely explained with reference to embodiments in comparison with the conventional slide members.

WORKING EXAMPLE 1

End surfaces of a ring which is a rotary wear test piece having an outer diameter of 25.6 mm, an inner diameter of 20.0 mm and a thickness of 16 mm were (A) plated with chromium, (B) gas spray-coated with molybdenum, (C) plasma spray-coated with a powdery mixture consisting of 10% of the Fe/Ni alloy (Fe, 42%-Ni, 4.8%-Cr, 1%-B, 8.8%-Si, 0.9%-C; its ratio is the same hereinafter) and 90% of the Fe/high-Cr alloy (Fe, 65%-Cr 8.2%-C, 1.5%-Si: its ratio is the same hereinafter), (D) plasma spray-coated with a powdery mixture consisting of 30% of the Fe/Ni alloy and 70% of the Fe/high-Cr alloy, (E) plasma spray-coated with a powdery mixture consisting of 70% of the Fe/Ni alloy and 30% of the Fe/high-Cr alloy, and (F) plasma spray-coated with 100% of the Fe/high-Cr alloy powder, each thickness being 0.20 to 0.30 mm. The plated surfaces and the spray coated surfaces were ground. Each of the above test pieces was so placed as to come into contact with the end surface of another test piece made of a carbon steel (Japan Industrial Standard [JIS] S45C) of a size of 25.6 mm in outer diameter, 20.0 mm in inner diameter and 16 mm in thickness. Castle motor oil SAE30 as a lubricating oil was supplied to the contact surfaces, and the load was varied from 10 kg to 500 kg to measure a limit load at which seizing develops and a frictional coefficient, and the damaged condition of the surface was observed.

As a result, (A) the test piece plated with chromium was seized up under the load of 200 to 250 kg, (B) the test piece gas spray-coated with molybdenum did not develop seizing even under the load of 500 kg, and the test pieces (C) to (F) plasma spray-coated with the powdery mixtures were seized up under the load of 325 to 350 kg.

The greatest frictional coefficients were exhibited by the test piece (B) gas spray-coated with molybdenum, by the test piece (F) plasma spray-coated with 100% of the Fe/high-Cr alloy powder, and by the test piece (C) plasma spray-coated with the powdery mixture consisting of 10% of the Fe/Ni alloy and 90% of the Fe/high-Cr alloy. The second greatest frictional coefficients were exhibited by the test piece (D) plasma spray-coated with the powdery mixture consisting of 30% of the Fe/Ni alloy and 70% of the Fe/high-Cr alloy, and by the test piece (E) plasma spray-coated with the powdery mixture consisting of 70% of the Fe/Ni alloy and 30% of the Fe/high-Cr alloy. The smallest frictional coefficient was exhibited by the test piece (A) plated with chromium.

It was also attempted to effect the plasma spray coated to carry out the above-mentioned test using 100% of the Fe/Ni alloy powder, but due to poor adherence property, however, it was impossible to obtain the spray-coated layer of a specified thickness of 0.2 to 0.3 mm.

WORKING EXAMPLE 2

An end surface of a die having a side of 8 mm in square shape was subjected to the same treatments (A) to (F) as those of Working Example 1 under the same conditions as in Working Example 1, Thicknesses of the layers being 0.25 to 0.30 mm. Each of the spray-coated surfaces was ground. By using a slide wear tester, the spray-coated surface was brought into contact with the outer peripheral surface of a test piece of cast iron (JIS FC25), as an opponent member, having an outer diameter of 50 mm, an inner diameter of 30 mm and a width of 10 mm, and was rotated at 225 rpm (0.59 m/sec) under a load of 100 kg to effect the wear test for 1 hour while being supplied with the Castle motor oil SAE 30.

The results were as shown in the FIGURE, in which the upper side represents the amounts worn out (losses by wear, mg) of the opponent members, the lower side represents the amounts worn out (width of wear trace, mm) in the end surfaces of the dies, and symbols (A) to (F) correspond to those of the materials spray-coated in the Working Examples to indicate the results of wear. FIG. 1 and observation of the end surfaces of the dices during the test teach the following facts.

The end surface of the die (A) plated with chrome began fuming a little after about 10 minutes and was more seized up than in normal state. The chromium plate exhibited a Vickers' hardness of as great as 900 to 1100, and was worn out little because it was hard but caused the opponent member to be worn out the most remarkably among other test pieces. The test piece (B) gas spray-coated with molybdenum exhibited a Vickers' hardness of 600 to 800, and was worn out in large amounts, although it was not seized up. However, the coarsened surface of the spray-coated layer caused the opponent member to be worn out in large amounts. The test piece (F) plasma spray-coated with 100% of the Fe/high-Cr alloy powder began fuming a little after about 30 minutes, and was worn out not in so large amounts but caused the opponent member to be worn out in large amounts.

On the other hand, the test piece (C) plasma spray-coated with the powdery mixture consisting of 10% of the Fe/Ni alloy and 90% of the Fe/high-Cr alloy, the test piece (D) plasma spray-coated with the powdery mixture consisting of 30% of the Fe/Ni alloy and 70% of the Fe/high-Cr alloy, and the test piece (E) plasma spray-coated with the powdery mixture consisting of 70% of the Fe/Ni alloy and 30% of the Fe/high-Cr alloy, which were prepared according to the present invention, were not seized up, worn out in amounts far smaller than the test piece (B) gas spray-coated with molybdenum, and caused the opponent member to be worn out in small amounts.

With reference to the mixing ratio of the Fe/Ni alloy powder to the Fe/high-Cr alloy powder, as the amount of Fe-Ni alloy powder increases, the amounts worn out of the test piece remain almost unchanged, but the amounts worn out of the opponent member are reduced.

In addition to the aforementioned Working Examples, it is also allowable in the present invention to use as a Fe/Ni alloy, [Fe, 35 to 55%-Ni, 0 to 8%-Cr, 4 to 10%-Si, 0 to 2%-C, and 0 to 3%-B], and as a Fe/high-Cr alloy, [Fe, 55 to 70%-Cr, and 3 to 9%-C]. Further, the Fe/high-Cr alloy may contain as much silicon, manganese, phosphorus, sulfur and the like as are usually contained in the carbon steels.

According to the present invention, it is necessary to contain the Fe/Ni alloy powder in an amount of 5 to 80% of the total amount of the powders. This is because, if the amount of the Fe/Ni alloy powder is smaller than 5%, the opponent member is worn out to a approximately same degree as the case when the Fe/-high-Cr alloy powder alone is used. Further, if the amount of the Fe/Ni alloy powder exceeds 80%, the material itself exhibits good wear resistance, but its large coefficient of thermal expansion deteriorates the adherence, making it difficult to spray coat the layer to a predetermined thickness (for example, 0.2 to 0.4 mm), and further requires increased manufacturing cost.

INDUSTRIAL APPLICABILITY

As mentioned above, the slide member according to the present invention exhibits excellent wear, scuffing and seizing resistance, and minimizes the wear of the opponent member. Therefore, the slide member according to the present invention is very useful as slide member applied to slide surfaces such as of piston rings, cylinder liners and slide surfaces of the air compressors for internal combustion engines.

What is claimed is:

1. A slide member, comprising: a spray-coated layer on a base material, said spray-coated layer being provided by the plasma spray coating of a mixture consisting of from 5 to 80% by weight of a first powder of Fe/Ni alloy and from 95 to 20% by weight of a second powder of an iron-chromium alloy consisting of 55 to 70% Cr and 3 to 9% C with the balance Fe.

2. The slide member of claim 1, wherein said Fe/Ni alloy powder consists of 35 to 55% Ni; 0 to 8% Cr, 4 to 10% Si, 0 to 2% C and 0 to 3% B with the balance Fe.

3. The slide member of claim 1, wherein said layer ranges from 0.2 to 0.4 mm thick.

4. The slide member of claim 1, wherein said powder mixture consists of 10% to 70% of said Fe/Ni powder and 90% to 30% of said iron-chromium alloy powder.

5. The slide member of claim 1, wherein said Fe/Ni alloy powder consists of 42% Ni, 4.8% Cr, 1% B, 8.8% Si, and 0.9% C with the remainder iron and wherein said iron-chromium powder alloy consists of 65% Cr, 8.2% C and 1.5% Si with the balance iron.

6. A slide member, comprising:
a spray-coated layer containing from 1.75–44% nickel and from 11–74.1% Cr on a base material, said spray-coated layer being provided by the plasma spray coating of a mixture consisting of from 5 to 80% by weight of a first powder of Fe/Ni alloy and from 95 to 20% by weight of a second powder of an iron-chromium alloy consisting of 55 to 70% Cr and 3 to 9% C with the balance Fe.

* * * * *